Feb. 3, 1925.
J. C. BERTSCH
GAS EXPANDER ABSORBER
Filed Oct. 7, 1920
1,525,060
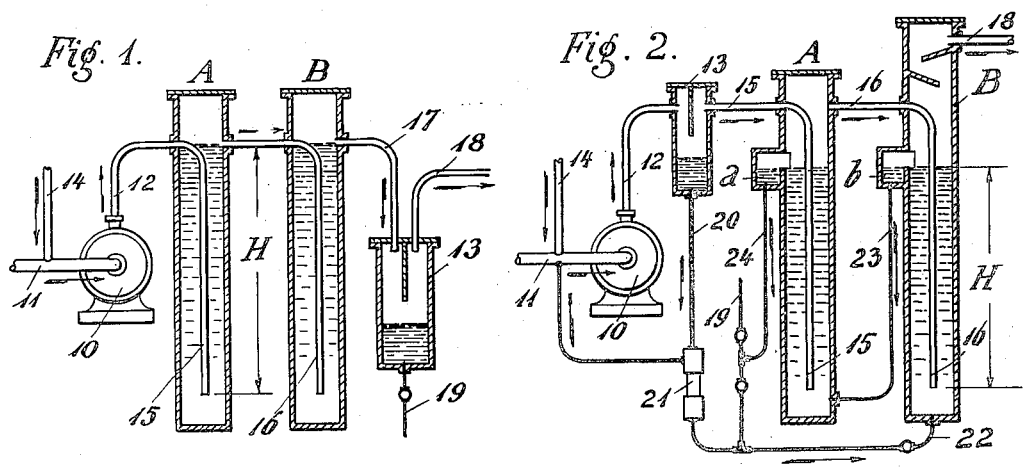
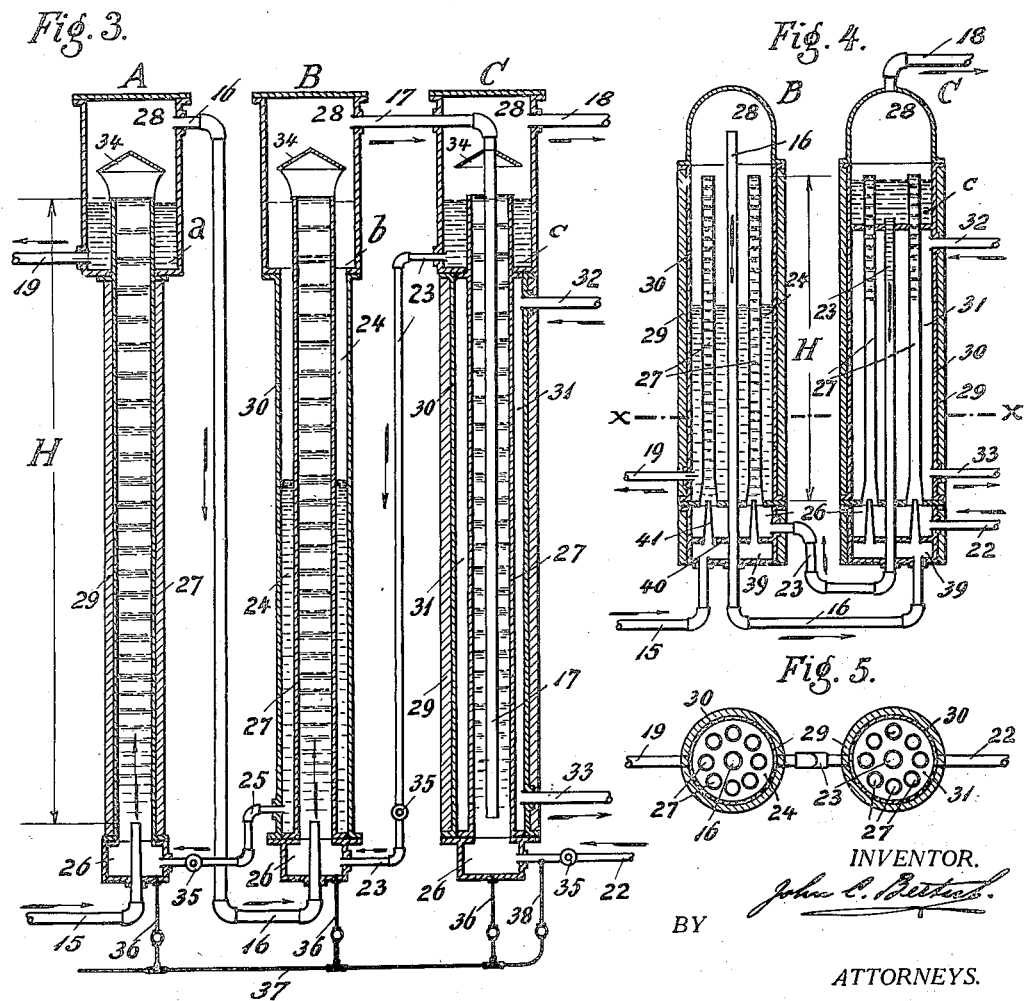
INVENTOR.
John C. Bertsch
BY
ATTORNEYS.

Patented Feb. 3, 1925.

1,525,060

UNITED STATES PATENT OFFICE.

JOHN C. BERTSCH, OF TULSA, OKLAHOMA.

GAS EXPANDER-ABSORBER.

Application filed October 7, 1920. Serial No. 415,336.

*To all whom it may concern:*

Be it known that I, JOHN C. BERTSCH, a citizen of the United States, residing at Tulsa, in the county of Tulsa and State of Oklahoma, have made a new and useful Invention in Gas Expander-Absorber, of which the following is a specification.

This invention relates to improvements in processes of and apparatus for expanding a gas and absorbing its vapor content by a liquid.

An object of the invention is to absorb vapor from a gas mixed with a liquid absorbent while elevating the liquid by the expansion of the gas.

Another object of the invention is to elevate and cool a liquid by the expansion of a gas under pressure.

Still another object of the invention is to convert gas pressure into hydrostatic pressure by elevating a liquid by the expansion of a gas, and then utilizing the sum of the pressures of gas and liquid for doing work.

A further object of the invention is to provide simple means for intimately mixing a gas with a liquid, and cooling the mixture while elevating its liquid by the expansion of its gas.

With these and other objects in view, as will more fully appear hereinafter, the invention consists in certain novel features of procedure as well as arrangements of parts, hereinafter fully described, illustrated in the accompanying drawing and pointed out in the appended claims; it being understood, that various changes in the methods, parts and combinations employed, may be made without in the least departing from the spirit of the invention or sacrificing any of its advantages.

It is well known that the magnitude of the temperature drop of an expanding gas is depending upon the energy lost by the gas molecules during expansion. In the case of a gas expanding freely into the atmosphere, there is no receding mass to absorb its energy in the form of an impulse; all the work done is the separation of its own molecules against gravitation, the accession of a small residual momentum in itself, and the lifting of the atmospheric air. This absorbs but a small amount of energy, corresponding to a cooling of about one half of one degree Fahrenheit for every atmosphere the pressure falls.

But in the case of a gas under pressure expanding against a resistance which it overcomes in the act of doing work, the final energy of the gas molecules is less than the work they have done, and as their energy is their heat, the drop of the gas temperature is much greater than that possible with free expansion.

It is also well known that the absorbing power of a liquid, or its saturation with a gas or vapor, depends upon the temperature, the pressure, the size of particles to which the substances are broken up, and the length of time they are kept in contact with each other.

With this invention I make use of these phenomena by expanding a gas under pressure within a liquid in the act of elevating the same, thereby intimately mixing gas and liquid, and cooling the mixture in a substantially isothermal heat transferring cycle.

If the liquid employed is a suitable absorbent, and the gas contains a vapor, the invention is a combination process of, and apparatus for gas-expansion, liquid-cooling, and fluid-absorption, since during the expansion of the gas and elevation of the liquid, the latter is not only cooled, but it absorbs also the vapor content of the gas in steps of decreasing pressure.

As practiced heretofore, gas is expanded in two ways: either by passing it through an orifice or nozzle into a space of reduced pressure, which is called: " free expansion," or by performing mechanical work in an engine, which is called: " restricted expansion."

For the reason stated, " free expansion " has proven a failure as a cooling method, whereas " restricted expansion ", while effective in itself, causes frequent interruptions by freezing up passages and valves, also great radiation losses, owing to the great difference in the temperature of the two substances and their separation by metal walls.

In the present absorption methods the two substances are not intimately mixed, as the gas simply passes through sprays or pools of absorbing liquid, whereby the substances are neither broken up into fine particles, nor allowed to remain in close contact with each other for any length of time, so that the saturation of the absorbent with the vapor of the gas is reduced to a very minimum.

These defects and disadvantages are eliminated with my present invention, in which the isothermal heat exchange prevents the freezing of the absorbent liquid, and the direct contact between the gas and absorbent for a relatively long period results in a high saturation of the absorbing liquid with the vapor of the gas.

In carrying out my invention, any gas containing vapor may be used, such for example as that produced in the manufacture of oil from coal, shale, peat and the like; or those formed during coking coal or charring wood, or those contained in any analogous bituminous substance, all of which are known as "artificial gases"; or the so-called "natural gases" issuing from wells or being formed during the distillation of petroleum or any other substance. Whatever the origin or composition of the gas may be, I will hereinafter refer to it by the term "gas."

The vapor content of a gas may consist of benzol, ammonia, and the like, or of naphtha, benzine, gasoline, or the like, to which I will hereinafter refer by the term "vapor."

The liquid adapted for carrying out my invention, either as a heat carrier or absorbent, or as a combination of both, may be water, brine, oil, petroleum, and the like, depending entirely upon the effect desired. Whatever the substance may be, I will hereinafter refer to it by the term "liquid."

In the accompanying drawing, in which all non-essential valves and other fixtures are omitted, Figs. 1 and 2 are diagrams of apparatus showing the principles involved in my invention; Fig. 3 is a sectional view of expanders of different construction; Fig. 4 is a sectional view of a modified form of expanders, and Fig. 5 is a cross section along line $x$—$x$ of Fig. 4.

Observing the incomplete extraction of gasoline from natural gas, I attempted to improve upon the present methods of absorption by mixing the gas with the absorbent before compression, compressing the gas in the presence of the absorbent and discharging the mixture under pressure into cylinders in which the gas expanded more or less before being separated from the absorbent.

The apparatus used was similar to that shown in Fig. 1, in which to a rotary compressor 10, having a suction conduit 11 and a discharge conduit 12, are serially connected expanders —A— and —B— and a separator 13. The gas entered through suction conduit 11, into which the absorbent oil was injected through pipe 14 at the rate of from 7 to 35 gallons per 1000 cubic feet of gas, discharging the compressed gas with the oil through conduit 12 and pipe 15 into expander —A—, thence through pipe 16 into expander —B—, and then through pipe 17 into separator 13, from which the residue gas left through pipe 18, the oil being withdrawn through pipe 19.

In this manner kerosene of 49.1° gravity, circulated at the rate of 7.17 gallons per 1000 cubic feet of dry gas of 0.608 specific gravity, was raised to a gravity of 50.7° B., which equals 8.2 per cent saturation. Present practice is about 4 per cent saturation with a circulation of only about 5 gallons per 1000 cubic feet of wet gas. Discovering that the expanders contained a foamy mixture of only 55 per cent of oil, I adopted a gas expansion extended to the practical elevation and cooling of the liquid, and the lowering of the point of equilibrium of the respective vapor tensions, by subjecting the gas of a smaller vapor content and lower pressure to the least saturated liquid, and that of the highest vapor content and pressure to the most saturated liquid, thereby creating a quasi counter current relation in the flow of gas and liquid, as shown by Fig. 2.

Here again gas and liquid enter compressor 10 through conduit 11 and pipe 14, respectively, the mixture under pressure being discharged through conduit 12. But instead of passing it into expander A, as in Fig. 1, the mixture under pressure passes first through separator 13, from which only the gas passes through pipe 15 into expander A and through pipe 16 into expander B.

The liquid under pressure leaves separator 13 through pipe 20, to be either injected into expander B and pipe 14, or used as motive power in an injector or pump 21 for feeding fresh liquid into expander B through pipe 22. The mixture of gas and liquid formed at the bottom of expander B rises to the top, where the gas separates and leaves through pipe 18, whereas the liquid overflows into pocket —b—, gravitating through pipe 23 into the bottom of expander A, again mixing with gas, rising and separating just as done in expander B, the gas passing into the latter through pipe 16, and the liquid overflowing into pocket —a— and pipe 24, to be either returned through pipe 22 to expander B for recirculation, or withdrawn through pipe 19.

Thus gas and liquid travel in independent circuits in opposite directions, and each circuit is divided into several repeating cycles equal in number to the number of expanders used. In the drawings I have shown the gas circuit arranged in a clockwise, and the liquid circuit in a counter-clockwise rotation, but it must be understood, that this is not essential, as an arrangement in the reverse order gives exactly the same results.

The gas circuit begins always with the first or highest pressure expander and ends with the last or lowest pressure expander, whereas the liquid circuit begins with the last and ends with the first expander, in each of which a complete cycle is performed, consisting of the mixing of gas and liquid, the expansion of the gas in the act of elevating the liquid, and the separation of the mixture into gas and liquid.

In this manner a gas is expanded from any superior to any inferior pressure while doing useful work, which manifests itself by lowering the temperature of the expanded gas and elevated liquid.

Depending upon the magnitude of the pressure, gas expansion and absorption desired, the number of expanders and their height —H— varies greatly. For ordinary absorption purposes and a pressure of from 20 to 30 pounds, three or four expanders 40 to 50 feet high are required, whereas for greater pressures their number and height must be correspondingly increased.

Fig. 3 shows a typical arrangement of three expanders for carrying out my invention either for absorption or expansion alone, or for both combined, depending entirely upon the character of the gas and liquid used. The flow, mixing and separation of gas and liquid are substantially the same as described for Fig. 2, hence the gas compressor, feeding device and separator are omitted.

The gas entering through pipe 15 passes in succession through expander A, pipe 16, expander B, pipe 17, expander C and pipe 18, the liquid traveling in the opposite direction, entering through pipe 22 and leaving through pipe 19.

During this quasi counter flow of gas and liquid, the gas pressure falls in proportion to the resistance it must overcome in elevating the liquid of the mixture to the height —H—, and the liquid passes from one to another stage of increased pressure and constant or lower temperature, thereby maintaining its absorbing power throughout the process. Exactly the opposite is the case with the old methods, in which the liquid is always under a gas pressure which is substantially the same in all parts of the apparatus, while the heat of absorption increases the temperature of the liquid, causing a rapid decrease of its absorbing power.

That the anomaly of flowing a liquid against increasing pressures is only apparent, is shown by the following tabulated example in which compressed air of 20 pounds pressure and water at the rate of one gallon per cubic foot of free air are assumed as the working substances. The calculation is based on figure 3, the height —H— of expanders A, B and C being 50 feet, operating with a friction and slippage loss of 40 per cent, besides a loss of 5 per cent in pipes 16 and 17.

| Expander. | A | | B | | C | |
|---|---|---|---|---|---|---|
| | Bottom. | Top. | Bottom. | Top. | Bottom. | Top. |
| Gas pressure, pounds | 20.00 | 13.14 | 12.48 | 6.84 | 6.50 | 1.95 |
| Density of mixture | 0.242 | 0.205 | 0.201 | 0.167 | 0.164 | 0.134 |

Applying this example to Fig. 3, we see that water from any source, either from an elevation of about 16 feet, or under a pressure of about 6.9 lbs. is fed into the mixing chamber 26 of expander c through pipe 22 and check valve 35, in which it mixes with the air entering through pipe 15 and passing in succession through expander A, pipe 16, expander B and pipe 17, as indicated by arrows. Air and water form a mixture of a relatively low density, which by reason of the expansion of the air and the continuous flow of air and water into mixing chamber 26 rises within tube 27. When the mixture reaches the separating chamber 28 of expander C, air and water separate, the former escaping through pipe 18 at a pressure of 1.95 lbs., while the latter falls into pocket c and pipe 23 for repeating the cycle in expander B. As the pressure at the bottom of the latter is $12\frac{1}{2}$ lbs., or about 10.6 lbs. in excess of that on top of expander c, the water in pipe 23 accumulates to a column of about 26 feet, equal to a static pressure of about 11.2 lbs., which together with the air pressure of 1.95 lbs. upon it, overbalances the air pressure of $12\frac{1}{2}$ lbs. and enters the mixing chamber of expander B. Here again air and water mix, rise within tube 27 of expander B, and separate again in chamber 28 of the latter, the air passing through pipe 17 into expander C whereas the water falls into pocket b, annular space 24, and pipe 25 for repeating the cycle in expander A. As the pressure at the bottom of the latter is 20 lbs., or about 13.2 lbs. in excess of that on top of expander B, the water accumulates in the annular space 24 to a column of about 33 feet, equal to a static pressure of about 14.2 lbs., which together with the air pressure of 6.84 lbs. upon it, overbalances the friction head and air pressure of 20 lbs. and enters the mixing chamber 26 of expander A, in which the steps of mixing, rising and separating as before are repeated. After separation in chamber 28 of expander A, the air passes through the pipe 16 into expander B, whereas the water leaves expander A through pipe 19 under a pressure of 13.4 lbs. The actual work done by the expansion of one cubic foot of air from 20 to 1.95 lbs. is therefore the elevation of one gallon of water from 16 to 50 feet, plus the equivalent of 13.4 lbs. pressure, equal to about 30 feet, or a total elevation of 64 feet. It is evident, that the height of the columns of liquid feeding the expanders is self-adjusting, regardless of pipe friction or a change in pressures. For instance, if the pressure in mixing chambers 26 rises, the liquid in pipes 22, 23 and annular space 24 accumulates accordingly to columns of a greater height, and if the pressure in the mixing chambers falls, the height of the liquid columns decreases accordingly, while in either case the expander tubes 27 remain filled with a relatively light mixture of gas and liquid.

The resistance within tubes 27 varies with the quantity and density of the liquid used. One gallon of water per cubic foot of air with tubes of 50 feet high, produces a resistance of from 4½ to 7 pounds in each expander, whereas a relatively light oil fed at the rate of 0.2 pounds per cubic foot of gas in tubes of about 20 feet high offers only a resistance of about one pound per expander. The total length of all expanders of one system depends upon the service required and pressure employed, and the division of the needed total length into a greater number of shorter, or into a smaller number of longer expanders depends entirely upon economic and constructive considerations.

Fig. 3 shows expanders of different construction, each provided with a mixing chamber 26, an expander tube 27, and a separating chamber 28. The exterior surfaces may be protected by non-conducting coverings 29, as shown in expanders A and C, and the tubes 27 may be placed within a casing 30 to form an annular space 24 as an extension of pocket —b—, as in expander B. But casing 30 may also form with tube 27 an independent cooling chamber 31, having pipe connections 32 and 33, as shown by expander C in Figs. 3, 4 and 5.

Through chamber 31 gas or liquid may be circulated either for being cooled by the contents of tube 27, or for cooling the latter, as for instance, the liquid leaving expander A through pipe 19 may be used in chamber 31 for cooling the contents of tube 27; or the gas may be pre-cooled by the contents of tube 27 before entering expander A through pipe 15.

The gas may enter through pipes located either externally, as in expanders A and B, or internally, as in expander C, in Fig. 3, the tubes 27 being in either case provided with a deflector 34 for arresting particles of liquid carried by the outgoing gas.

Check valves 35 are provided in the liquid pipes 22, 23 and 25 for preventing the gas from blowing back, and each mixing chamber 26 is provided with a drain 36, connected by a manifold 37 and pipe 38 to liquid pipe 22 for transferring the liquid from one expander to another during starting operations.

Figs. 4 and 5 show expanders B and C embodying the same principles as those in Fig. 3, but consisting of a plurality of tubes 27 within one casing 30. A gas chamber 39, connected with and separated from mixing chamber 26 by a partition 40, supplies the expander tubes 27 with gas through nozzles 41 which are carried by partition 40. This type of expander-absorber is preferable for apparatus of a large capacity, as it insures a better breaking up of gas and liquid than the single tube expander, owing to the uniform distribution of a number of smaller gas jets over a larger area.

Gas pipe 16 and liquid pipe 23 are located centrally within casing 30, instead of being arranged externally as shown by Fig. 3. However, either one construction may be applied to either one expander shown by Figs. 3 and 4.

Having thus fully described my invention, what I claim as new, and desire to secure by Letters Patent, is:—

1. The process of gas expansion-absorption, which consists in elevating a menstruum to at least one-half of its barometric height by the expansion of a gas mixed with it, and utilizing its hydrostatic head augmented by the pressure of the gas for repeating the cycle at a superior pressure.

2. The process of gas expansion, which consists in mixing a gas under pressure with a liquid and elevating the mixture from a low level to a relatively high level by the expansion of its gas, in separating said gas and liquid at said high level and in repeating the cycle at said low level by mixing said gas and liquid with a liquid and a gas of respectively superior pressures.

3. The process of gas expansion-absorption in multi-stages of substantially equal height and elevation, which consists in supplying the first and highest pressure stage with the gas and the last or lowest pressure stage with a menstruum, in passing said gas and menstruum from stage to stage in opposite directions to each other and utilizing the gas from the last stage and the menstruum from the first stage as the end products of the process, in mixing said passing gas and menstruum in each stage at a low level and elevating said mixture to a superior level by expanding its gas, and in separating in each stage at said superior level said gas and menstruum; the difference between said low and superior levels being at least one half of the barometric height of said menstruum.

4. The process of absorbing vapor from a gas containing it, which consists in repeatedly mixing a menstruum with the gas at a low level and elevating the mixture to a relatively high level by the expansion of its gas, in separating at said high level gas and menstruum and utilizing the work done upon the latter for mixing it in a renewed cycle with gas of a superior pressure in counter current to each other, and in saturating said menstruum with the vapor of the gas in stages of increasing pressures.

5. The absorption process, which consists in mixing at an inferior elevation a gas under pressure with a menstruum, in passing the mixture through absorbers to a superior elevation by the expansion of its gas, thereby saturating its menstruum with the vapor of its gas, in dis-associating said mixture at said superior elevation and passing the gas and menstruum separately to said inferior elevation in opposite direction to each other, and in repeating the cycle by mixing the menstruum from an absorber of an inferior pressure with gas of a superior pressure.

6. The gas expansion-refrigerating process, which consists in expending the gas mixture of gas and a liquid in the act of elevating said liquid and cooling said mixture; utilizing said cooled mixture as well as its gas and liquid separately as cooling agents, and utilizing the combined energy of the expanded gas and elevated liquid for doing work.

7. An absorption apparatus comprising a compressor adapted for putting a mixture of gas and a liquid under pressure; a vessel receiving said mixture under pressure and adapted for expanding its gas in the act of elevating and saturating its liquid; a separator for dissociating said expanded gas and elevated liquid; and conduits serially connecting said compressor, vessel and separator with each other and in circuit with devices for supplying and disposing of said gas and liquid, respectively.

8. An absorption apparatus comprising a compressor adapted for putting a mixture of gas and a liquid under pressure; a plurality of vessels receiving said mixture in successive steps of decreasing pressure and adapted for expanding its gas in the act of elevating and saturating its liquid with the vapor of its gas; a separator for dissociating said expanded gas and elevated liquid, and conduits serially connecting said compressor, vessels and separator with each other and in circuit with devices for supplying said gas and liquid, and disposing of said expanded gas and saturated liquid, respectively.

9. In a gas expander-absorber, a vertical vessel, having at its bottom a mixing chamber provided with inlet openings for gas and liquid and at its top a separating chamber provided with baffles and outlet openings for gas and liquid, and being adapted for expanding a gas in the act of elevating a liquid and putting it under pressure; and conduits connecting said mixing chamber with devices supplying it with gas and liquid and conduits connecting said separating chamber with devices for withdrawing from it said expanded gas and liquid under pressure.

10. A gas expander-absorber comprising a plurality of vertical vessels, each having at its bottom a mixing chamber provided with inlet openings for gas and a liquid and at its top a separating chamber provided with baffles and outlet openings for gas and liquid, and being adapted for expanding a gas in the act of elevating a liquid and putting it under pressure; conduits connecting the gas inlet of the first vessel and the liquid inlet of the last vessel with devices supplying gas and liquid, respectively; conduits connecting the liquid outlet of the first and gas outlet of the last vessel with devices disposing of the liquid under pressure and expanded gas, respectively; and conduits interconnecting the remaining inlet and outlet openings of all vessels for passing the partially expanded gas and liquid under pressure from the separating chamber of one vessel to the mixing chamber of the next one, but in opposite directions, the gas in line of decreasing pressures to the last of said vessels, and the liquid in line of increasing pressures to the first of said vessels, substantially as described.

11. The process of gas expansion-absorption, which consists in expanding a gas in the act of elevating a menstruum to at least one half of its barometric height, and in renewing the cycle with superior pressures by flowing gas and menstruum in countercurrent relation to each other, each cycle beginning and ending at substantially the same low and high levels, respectively.

12. The process of gas expansion-absorption, which consists in expanding a gas in the act of lifting a menstruum from an inferior to a superior elevation, and in flowing from the latter gas and menstruum separately in opposite directions for renewing the cycle with menstruum and gas of increased pressure.

13. The process of gas expansion which consists in elevating a mixture of gas and a liquid to a relatively high level and then dis-associating said mixture, and in mixing said dis-associated gas and liquid with liquid and gas of superior pressures, respectively, and renewing the cycle in a counter-current relation.

14. The process of cooling by the expansion of a gas, which consists in expanding the gas against the resistance of a liquid mixed with it, thereby cooling the mixture and elevating the liquid, and in separating the cooled gas and liquid and utilizing both as cooling agents.

15. The process of cooling by gas expansion in multi-stages, which consists in supplying the first and highest pressure stage with the gas and the last and lowest pressure stage with a liquid, in passing gas and liquid from stage to stage in opposite directions to each other and utilizing the gas from the last stage and the liquid from the first stage as cooling agents, in mixing said passing gas and liquid in each stage at a low level and elevating the mixture to a superior level by the restricted expansion of its gas and thereby cooling it, and in separating in each stage at said superior level said gas and liquid and circulating the former by virtue of its pressure and the latter by virtue of its elevation augmented by the pressure of the gas upon it.

In testimony whereof, I have hereunto subscribed my name this 4th day of October, A. D. 1920.

JOHN C. BERTSCH.